United States Patent Office.

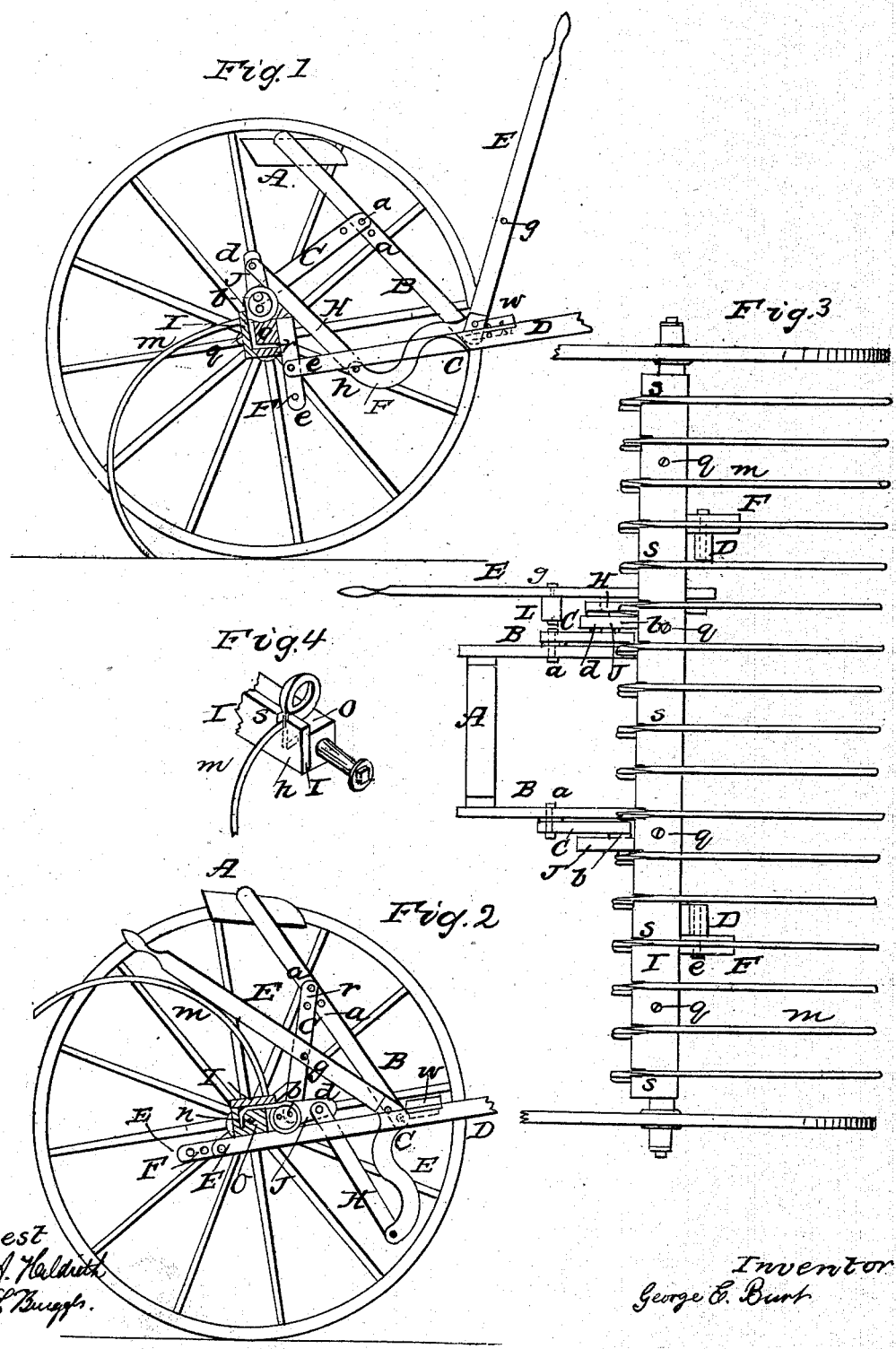

GEORGE E. BURT, OF HARVARD, MASSACHUSETTS.

*Letters Patent No. 68,950, dated September 17, 1867.*

---

IMPROVEMENT IN HORSE-RAKES.

---

The Schedule referred to in these Letters Patent and making part of the same.

---

TO ALL WHOM IT MAY CONCERN:

Be it known that I, GEORGE E. BURT, of Harvard, in the county of Worcester, in the State of Massachusetts, have invented new and useful Improvements in Horse Hay-Rakes; and I do hereby declare that the following is a full and exact description thereof, reference being had to the accompanying drawings, and to the letters of reference marked thereon.

Like letters represent like parts in all the figures.

Figure 1 is a side vertical projection, on a plane passing between the shafts and the wheel, showing the position of the several parts when in position to rake.

Figure 2 is a side vertical projection on the same plane as fig. 1, showing the position of the parts when the rake is elevated to discharge the hay.

Figure 3 is a rear view of the rake.

Figure 4 is an isometric view, showing the method of attaching the teeth $m$ to the axle O.

The nature of my invention consists in constructing a self-regulating horse-rake, so arranged that the draught of the horse in propelling the rake shall, in conjunction with the operator's weight, hold the teeth of the rake down, and gradually increase the downward pressure in proportion to the accumulation of hay in front of the teeth, and enabling the operator to adjust the pressure on the teeth to heavy or light crops, avoiding in a great measure the scratching up of the soil, as in a commonly-constructed wire-tooth rake.

To enable others skilled in the art to make and use my invention, I will proceed to describe its construction and operation.

I construct this rake with wire teeth, and mount it on wheels in the usual manner, but I attach to the axle O downward projecting arms F F, in fig. 1, in which I make two or more sets of holes, E E, or a slot, considerably below the axle O. To either set of the holes I attach the shafts D D. For a light crop I use the upper set of holes, but for a heavy crop I lower the shafts on the arms F F until the downward force on the teeth $m$ is sufficient to rake the hay. Also, to the axle O I attach the upward projecting arms J J, which are provided with two or more sets of holes, shown in figs. 1 and 2 and 3, to which I pivot connecting arms C C, which are also pivoted to the seat arms B B, shown in fig. 1, by the pivots $a\ a$. The seat arms B B are pivoted to the cross-bar $w$ by the pivot $c$, which is secured to the shafts thus by means of the cross-bar. The arms C and B are both provided with two or more sets of holes, $a\ a$ and $r\ r$. E is a lever, and is pivoted to the cross-bar $w$ by the pivot $c$. H is a connecting arm, one end of which is pivoted to the lever E by the pivot $h$, and the other end is pivoted to the arm J by the pivot $d$. L is a treadle, attached to the lever E, as shown in fig. 3. I construct the axle O with seats to receive the teeth $m\ m\ m$. To the axle O I firmly attach the clamp I, provided with slots $s\ s$, shown in all the figures. The teeth $m\ m$ are made with a coil, in the usual manner, but on the shank of the tooth $m$ I construct the start $n$, which is made by bending a portion of the shank at nearly a right angle with the remaining portion of the shank, and both shank and start are embedded into the axle O, and fixed rigidly to the axle in their positions by the clamp I, which is secured firmly to the axle by the screws $q\ q$, shown in figs. 1 and 3. The slots $s\ s\ s$ operate as guides for the teeth $m\ m\ m$, shown in figs. 4, 3, and 1.

Operation.

The operator being in his seat, his weight rests on the pivots $a\ a$, and the arms C and B forming an obtuse angle, the operator's weight acts powerfully to spread the angle and force the shafts D forwards, which, being pivoted to the downward projecting arms F F, tends to turn the axle O backward and hold the teeth $m$ down. The same force is also exerted upon the arm J, which is pivoted to the arm C, which also acts to force the arm J backward, and also hold the rake down. Thus it will be seen that the operator's weight acts with a double force (both above and below the axle) to hold the rake down. This force may be regulated for the various weights of different operators by increasing or diminishing the angle formed by the arms B and C by means of the different holes in the arms. It will readily be seen, when the horse is attached to the shafts D and moves forward to draw the rake, the shafts being pivoted to the arms F F at a considerable distance below the axle, that the power exerted by the horse to propel the rake will tend to draw the arms F F forward. Thus the whole force of the draught of the horse will tend to turn the axle over backward in the wheels, which will hold the teeth $m\ m$ firmly down. As the hay accumulates in front of the teeth, the teeth will spring back, thus allowing the axle to turn backward, and the angle between the arms B and C is increased, and thus the weight of the operator acts with more force on the arms J and F. The horse now exerts more force to draw the rake, which force, acting on the arms F, acts in conjunction with the increased force of the operator, and bears the teeth down just in proportion as the hay accumulates, thus adjusting itself to large or small windrows. If the hay is moist or the crop very heavy, the lower set of holes may be used, thus increasing the downward pressure on the teeth to any degree required, operating with equal pressure on the teeth, and avoiding unnecessary pressure at all times, and avoiding in a great measure the objection to spring teeth, of scratching up the soil, injuring the grass roots, and damaging the hay by the dust collected with it. To discharge the rake, the operator draws the lever E towards him. This turns the axle forward in the wheels, and the ends of the teeth m m m are elevated above the axle O, and a free discharge is effected, (shown in fig. 2.) The slots s s in the clamp I assist in holding the teeth m m in position when the rake is being turned, with the teeth resting on the ground, but allow them to spring upward to pass obstructions. The start n holds the coil of the tooth firmly in its position. The clamp I fixes the teeth rigidly to the axle O. If the horse should become unmanageable, the driver may place his foot against the treadle L to steady himself in his seat, and thus assist him to manage the horse.

What I claim as my invention, and wish to secure by Letters Patent, is—

1. In combination with the teeth m, axle O, and arm J, a toggle-joint, formed by the levers C and B, acted upon by the weight of the driver riding upon a seat, resting upon the joint in such manner that as the teeth are drawn back the toggle-joint shall be straightened, and the weight of the driver be made to act upon the teeth with a correspondingly-increased downward pressure, substantially as set forth.

2. The combination of the shafts D, arm F, levers H, E, B, and C, arm J, and axle O, substantially as set forth.

3. The combination of the teeth m, the axle O, and clamp I, when respectively constructed and arranged substantially as set forth.

4. The combination of the shafts D, arm F, axle O, and teeth m, substantially as set forth.

5. The arm J on one side of the axle, in combination with the arm F on the other side thereof, when connected with the shafts D, one directly and the other through intermediate levers H and E or C and B, so arranged that the draught upon one and pressure against the other arm shall unite to turn the axle towards and hold down the teeth, substantially as set forth.

GEORGE E. BURT.

Witnesses:
   E. A. HILDRETH,
   J. L. BURGESS.